United States Patent [19]

Hannush

[11] Patent Number: 5,129,192

[45] Date of Patent: Jul. 14, 1992

[54] VENTILATING SYSTEM FOR VEHICLES

[76] Inventor: Raja B. Hannush, 28 Kanon Ct., Newtown, Pa. 18940

[21] Appl. No.: 646,856

[22] Filed: Jan. 28, 1991

[51] Int. Cl.$^5$ .............................................. E05F 15/08
[52] U.S. Cl. ..................................... 49/349; 236/49.3; 454/75
[58] Field of Search .................... 236/1 R, 49.3 X; 98/88.1, 2.02 X; 49/349, 29

[56] References Cited

U.S. PATENT DOCUMENTS

| | | | |
|---|---|---|---|
| 2,190,402 | 11/1938 | Curzon | 49/21 X |
| 2,499,544 | 5/1948 | Vancil | 49/21 X |
| 2,621,037 | 8/1950 | Riedel | 268/20 |
| 2,944,525 | 8/1961 | Onksen et al. | 268/19 |
| 3,339,665 | 9/1967 | Johnstone et al. | 49/349 X |
| 4,257,319 | 3/1981 | Kucharczyk | 98/37 |
| 4,443,978 | 4/1984 | Butler | 52/1 |
| 4,852,469 | 8/1989 | Chuang | 98/2.02 X |

FOREIGN PATENT DOCUMENTS 3016907 11/1981 Fed. Rep. of Germany ....... 98/2.02

Primary Examiner—William E. Wayner
Attorney, Agent, or Firm—Price, Heneveld, Cooper, DeWitt & Litton

[57] ABSTRACT

An electrical circuit for lowering windows or shields a predetermined distance, such as for allowing hot air to escape from a parked vehicle. The circuit includes a primary switch to activate motors for lowering windows, and further includes a sensor for stopping the motor when the window is lowered the predetermined distance. The primary switch may activate the simultaneous lowering of a plurality of windows the predetermined distance. The circuit optionally includes a thermostat for automatic operation when a preset temperature is sensed. In alternative embodiments, the predetermined distance and the preset temperature are adjustable.

16 Claims, 2 Drawing Sheets

VENTILATING SYSTEM FOR VEHICLES

BACKGROUND OF THE INVENTION

This invention relates to an electrical circuit for the control of vehicle windows, and particularly to a circuit for the control of power driven windows for automobiles, trucks and the like.

Automobiles, trucks and other vehicles have long made use of power operated windows. Typically such power operated windows include an electrical circuit that has a separate window control switch located at each door or sidewall for raising and lowering the associated window. Additionally, these control circuits typically include a master switch for each of the vehicle windows that is located in the driver seat door or elsewhere on the console in order to permit the driver to operate all of the windows in the vehicle individually. In some instances, a power override switch is also located proximate the driver's seat so that the driver can shut off all of the individual windows in the vehicle. Control circuits include such a power override for safety reasons, such as to prevent children from playing with backseat window controls and the like.

In typical power window circuits, the window control switch either raises or lowers the window for as long as the control switch is engaged. Once the operator releases the switch, the window stops at that location. In this manner, the user can raise or lower the window the desired distance.

For precautionary reasons, some vehicle windows are provided with a fully opened position in which the pane is not fully lowered into the vehicle door or sidewall. The upper end of the pane projects up into the window frame in order to partially block the frame. This arrangement protects against small children or pets from inadvertently falling out of the window, yet still provides ventilation for the vehicle.

One problem experienced with automobiles and other vehicles is the over heating of the passenger compartment while the vehicle is unattended. This problem is particularly acute in warm climates. For security reasons most vehicle owners prefer to keep the automobile windows substantially closed in order to prevent people from reaching in through an open window. Nonetheless, when windows are fully closed the vehicle compartment can become extremely hot. In the event that a pet is left within a fully closed passenger compartment, overheating can present a substantial danger to the animal.

In order to avoid the overheating problem, vehicle owners may manually open individual windows a short distance to provide ventilation for the passenger compartment and allow the escape of hot air. Since the operator is required to individually adjust the opening of the window, the adjusting of the vehicle windows to a venting position can be an inconvenient exercise. This is particularly true in instances where the operator has previously been using air conditioning, so that the windows are fully closed and the operator is unaware of the exterior temperature. The operator does not become aware of the problem until the vehicle has been shut off and the driver steps out of the vehicle. Since most power driven windows are shut off when the ignition key is removed from the accessory position, the driver must get back in the car and place the key in the ignition in order to open the windows.

SUMMARY OF THE INVENTION

The present invention is directed to an electrical circuit which automatically lowers the windows or shields of an automobile, truck or other vehicle a predetermined venting distance in order to allow hot air to escape from the passenger compartment. At least one window is mounted in the vehicle to have a raised closed position, a lowered open position and a preselected lowered venting position. A power driven motor raises and lowers the window in response to an operator activated window control switch in a conventional manner. A separate although cooperating venting circuit includes a primary venting switch electrically coupled to the power source and motor in order to activate the motor to lower the window. A sensor determines when the window is lowered the predetermined distance to the venting position and shuts off the window motor in response. When the vehicle operator intends to leave the vehicle unattended, the operator activates the primary venting switch and the window or shield automatically lowers to the venting position.

In a further embodiment, a thermostat is included in the venting circuit for automatically lowering the window when the vehicle's passenger compartment reaches a preselected temperature. In another embodiment, all of the vehicle windows are coupled in the venting circuit, so that activation of the primary venting switch simultaneously opens all of the windows the venting distance. In still another alternative embodiment, each window is equipped with a separate venting circuit and primary venting switch.

With the present invention, a vehicle operator may quickly and easily open the window or windows of the vehicle to the venting position merely by hitting the primary venting switch. The operator is not required to adjust the window opening or to continue to depress the primary venting switch until the window reaches the venting position. In embodiments in which the venting circuit remains operational when the vehicle ignition is turned off, the operator can readily open vehicle windows to the venting position without the inconvenience of having to restart the vehicle. This is particularly useful in vehicles having air conditioning in which the operator may not realize the outside temperature until after he has turned off the ignition and stepped out of the vehicle. Although the circuit lowers the window sufficiently to permit hot air to escape from the passenger compartment, the window is sufficiently closed to prevent someone from reaching in through the opened window.

These and other benefits, features and objects of the invention will be recognized by one skilled in the art from the description and claims which follow and the drawings appended hereto.

DETAILED DESCRIPTION OF THE PREFERRED EMBODIMENTS

Figure 2:
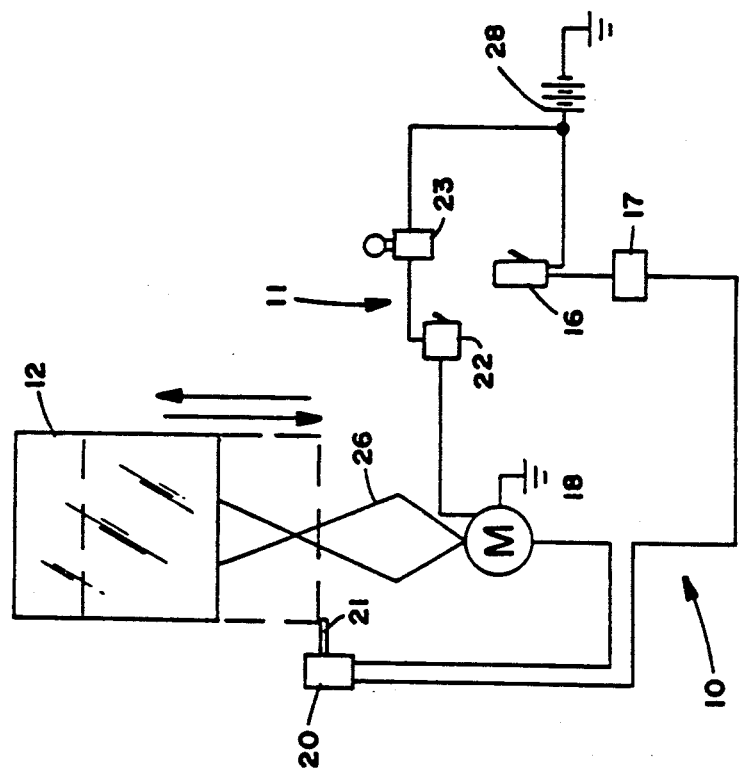
FIG. 2 is a schematic drawing showing a preferred embodiment of a window controlling circuit used in the vehicle of FIG. 1.
Figure 1:
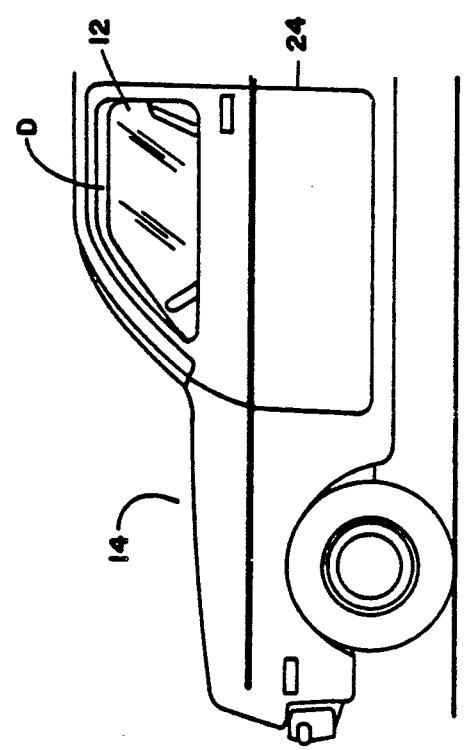
FIG. 1 is a fragmentary elevational view of an automobile incorporating a window controlling circuit embodying the present invention, with the automobile window shown in a lowered venting position.

The invention is embodied in an electrical window control circuit, a preferred form of which is shown in FIG. 2 and referenced generally by the numeral 10. As shown in FIG. 1, venting circuit 10 is used to lower windows or shields 12 of a vehicle 14 a predetermined venting distance "D" in order to permit hot air or gases to escape from the passenger compartment. Venting circuit 10 includes a primary venting switch 16 (FIG. 2) which activates a motor 18 to lower window 12, and further includes a sensor 20 that stops motor 18 when window 12 is lowered the predetermined venting distance "D". Venting distance "D" is preferably sufficient to provide ventilation of hot air from the passenger compartment, but too small to permit an arm to pass through the opening.

In a first preferred embodiment, vehicle 14 includes a conventional power window control circuit 11 (FIG. 2) that utilizes motor 18 to raise and lower window 12. Motor 18 is connected to a window control switch 22 and the vehicle ignition switch 23. Window control switch 20 will therefor not operate window 12 unless ignition switch 22 is in an "accessory" or "on" position. Venting circuit 10 (shown in FIG. 2) is run separate from the conventional power window control circuit 11. In this venting circuit 10, motor 18 is a reversible DC electric motor which is mounted within car door 24. Motor 18 is connected to window 12 by a mechanical linkage 26 and adapted to vertically slide window 12 within door 24 between an open and a closed position. It is contemplated that mechanical linkage 26 may be any linkage which will operably connect motor 18 to window 12 and which is suitable for application in a vehicle. Primary venting switch 16 is preferably conveniently located within vehicle 14 proximate the driver's seat, such as in the driver's door or in the console, so that an operator can easily reach and activate it. Alternatively, primary venting switch may be located elsewhere in the vehicle, yet is positioned so as to be accessible to an operator. Preferably primary venting switch 16 is a manually activated push switch.

Sensor 20 is preferably a contact switch that senses the position of window 12 and is positioned such that window 12 contacts sensor 20 as window 12 is lowered to the preselected lowered venting position. In the preferred embodiment, window 12 mechanically contacts and trips a contact member 21 located on sensor 20. When tripped, contact member 21 opens the switch of sensor 20 so that an open circuit is formed and motor 18 is shut off.

Alternatively, sensor 20 may be other suitable sensor devices that determine when window 12 has reached the venting position and deactivate motor 12. Venting circuit 10 may also alternatively utilize other means for determining when window 12 has reached the venting position, such as for example a timer switch 17 that is activated upon the triggering of primary venting switch 16 and which opens the circuit to motor 18 after a preselected time interval. As used herein, the term "sensor" would encompass such a timer switch.

Although the preferred embodiment of venting circuit 10 is used to control windows 12, other shields such as power sunroofs and the like may be controlled by venting circuit 10.

In operation of this first embodiment, when an operator desires to vent the vehicle, the operator closes primary switch 16. With window 12 in a closed position the switch of sensor 20 is closed and power is applied by a power source 28, such as the vehicle's battery, through venting switch 16 and sensor 20 to electric motor 18. Motor 18 actuates mechanical linkage 26 and lowers window 12 until contact is made with contact member 21. When sensor 20, thus determines that window 12 is in the lowered venting position, the switch of sensor 20 shuts off motor 18. If window 12 has been previously lowered to an open position, the switch of sensor 20 will be open and motor 18 will not be activated. Since window 12 is also operated by separate power window circuit 11, window 12 may be lowered and raised by switch 22 even when the switch of sensor 20 is open. Since venting circuit 16 is connected directly to power source 28, hitting primary venting switch 16 opens window 12 even when the keys are removed from ignition 23.

For safety reasons, primary venting switch 16 will preferably only activate motor 18 to lower and not raise window 12. Since activation of switch 16 causes window 12 to move to a preselected position, if window 12 were raised by switch 16, objects could inadvertently be caught and pinched in window 12 as it closes. However, in some applications triggering motor 16 to automatically raise window 12 to a predetermined position may be acceptable, and such an alternative embodiment is contemplated.

Figure 3:
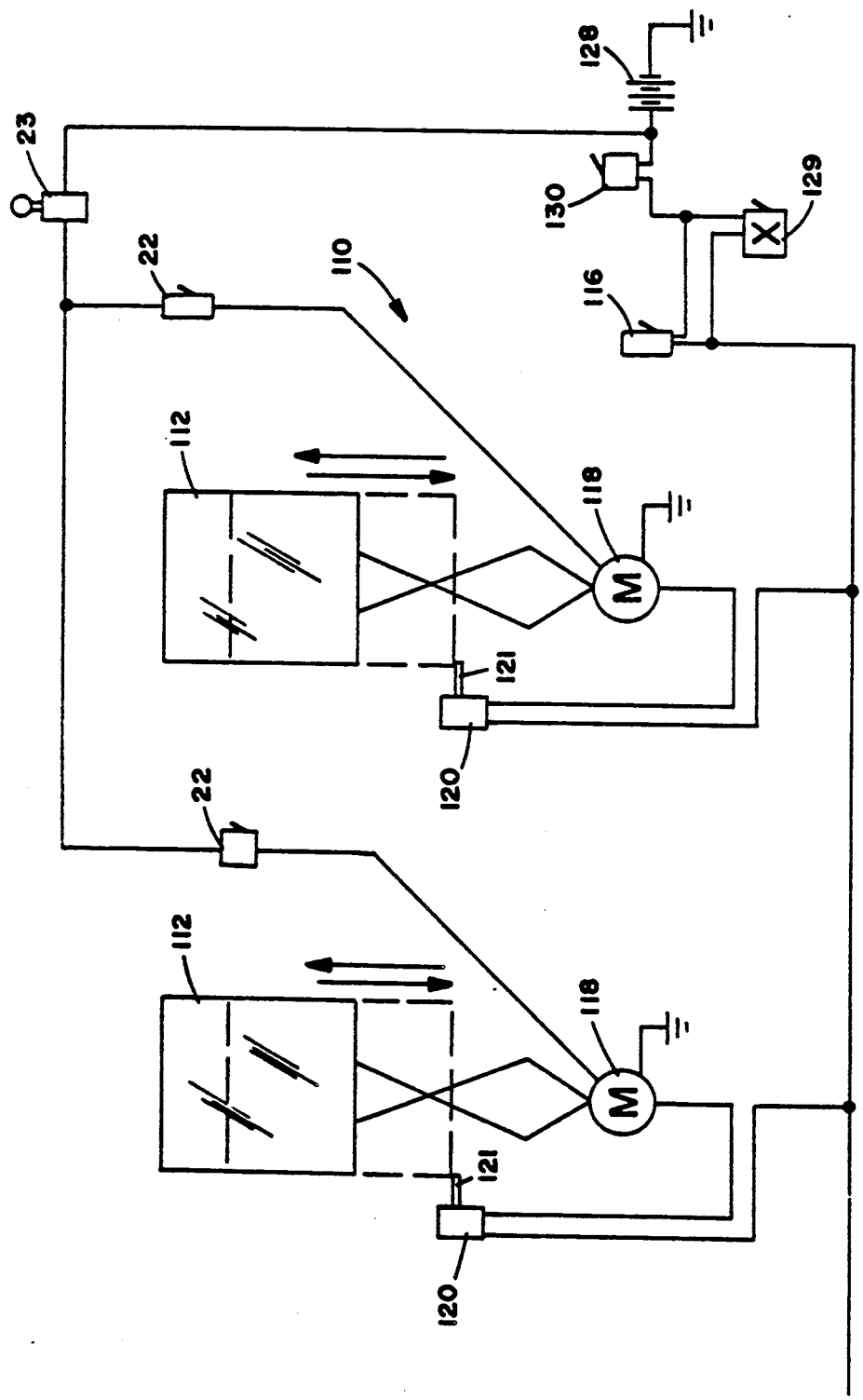
FIG. 3 is a schematic drawing of an alternative preferred embodiment of a window controlling circuit used in the vehicle of FIG. 1.

In a further embodiment of the present invention, additional features are added to the electrical venting circuit which is generally referred to by numeral 110 as shown in FIG. 3. Electrical venting circuit 110 includes multiple windows 112, a motor 18 individually connected to each of windows 112 and a sensor 120 mounted to individually access each window 112 on vehicle 14. In electrical venting circuit 110, all sensors 120 and motors 118 are connected in parallel with a single primary switch 116. Thus, all windows 112 are individually lowered simultaneously until sensors 120 at each station shut off individual motors 118. As described in relation to the embodiment of FIG. 1, each window 112 is provided with a window control circuit having a window control switch 22 for each window 112, in circuit with vehicle ignition switch 23.

Circuit 110 is further modified by incorporation of a thermostat 129. Thermostat 129 includes a normally open switch and is electrically coupled to power source 128 in order to supply power to motors 118. Thermostat 129 is positioned within vehicle 14 such that as the temperature within vehicle 14 reaches an undesirable preset temperature, the switch of thermostat 129 automatically closes to actuate motors 118, thus lowering vehicle windows 12 the predetermined venting distance "D". Primary venting switch 116 is connected in parallel with thermostat 129 so that an operator may also manually trigger motors 118. Thermostat 129 may alternatively include an adjustable temperature control. This allows an operator to adjust the temperature of thermostat 129, and thus allows the operator to control the temperature at which windows 112 will be lowered to the vent position. A manual override switch 130 is positioned in circuit 110 to deactivate venting circuit 110. Manual override switch 130 is located to cut off power to circuit 110 and thus prevent thermostat 129 from opening windows 112 at undesirable times, such as when it is raining.

In a further embodiment, sensor 20 is an adjustable sensor, such that the preselected lowered venting distance "D" can be adjusted to a user's preference. In still another embodiment, remote venting switches (not shown) are added to circuit 110 in series with each motor 118. The remote venting switches allow manual control over individual windows 112, thus allowing each passenger to manually open his window the preselected venting distance "D".

Although the preferred venting circuit embodiments are described as being separate from the conventional power window control circuit 11, alternatively the venting circuit may be incorporated into the power window control circuit. The system is particularly adapted for use with automobiles though other uses may be made.

It will become apparent to those skilled in the art that various modifications to the preferred embodiments of the invention can be made without departing from the spirit or scope thereof as defined in the appended claims and breadth of interpretation the law allows.

The embodiments of the invention in which an exclusive property or privilege is claimed are defined as follows.

1. An electrical circuit for lowering a vehicle window a predetermined distance to allow hot gases to escape from a vehicle comprising:
   a window operably mounted in a vehicle, said window having a raised closed position, a lowered open position and a preselected lowered venting position;
   a motor coupled to said window and adapted to raise and lower said window;
   a power source;
   a primary switch electrically coupled to said power source and said motor for activating said motor to lower said window; and
   a sensor adapted to sense when said window is lowered a predetermined distance to said venting position, said sensor electrically coupled to said motor to shut off said motor when said window is lowered said predetermined distance.

2. The circuit defined in claim 1, further comprising: a plurality of windows operably mounted in said vehicle, said windows each having a raised closed position, a lowered open position, and a preselected lowered venting position;
   a motor coupled to each of said windows and adapted to raise and lower said windows;
   said primary switch electrically coupled to each of said motors to activate said motors to lower said windows; and
   a sensor adapted to sense when each of said windows is lowered a predetermined distance to said venting position, and electrically coupled to said motors to shut off each of said motors when said windows are lowered said predetermined distance.

3. The circuit defined in claim 2 wherein each of said windows are simultaneously lowered.

4. The circuit defined in claim 3 further comprising:
   a thermostat electrically coupled to said power source and said motors and adapted to automatically activate said motors to lower said windows when said thermostat senses a given preset temperature.

5. The circuit defined in claim 4 wherein said thermostat is adjustable such that said preset temperature is selectable.

6. The circuit defined in claim 4 further comprising:
   a manual override switch electrically coupled with said thermostat to selectively render said thermostat inoperative.

7. The circuit defined in claim 2 wherein said predetermined distance is adjustable.

8. The circuit defined in claim 2 including a remote switch for each of said windows adapted to lower each of said windows said predetermined distance.

9. The circuit defined in claim 1 including a thermostat electrically coupled to said power source and said motor for automatically activating said motor to lower said window when said thermostat senses a given preset temperature.

10. The circuit defined in claim 9 wherein said preset temperature is adjustable.

11. The circuit defined in claim 2 including a thermostat electrically coupled to said power source and said motors for automatically activating said motors to lower said windows when said thermostat senses a given preset temperature.

12. The circuit defined in claim 1 wherein said predetermined distance is adjustable.

13. The circuit defined in claim 1 wherein said sensor is a limit switch positioned so that said window contacts said limit switch as said window moves to said preselected lowered venting position.

14. The circuit defined in claim 1 including a timer adapted to shut off said motor a given period of time after said primary switch is activated.

15. The circuit defined in claim 1 further comprising:
   a thermostat electrically coupled to said power source and said motor and adapted to activate said motor to lower said shield when said thermostat senses a given preset temperature.

16. The circuit defined in claim 15 further comprising: a manual override switch electrically coupled with said thermostat to selectively render said thermostat inoperative.

* * * * *